US011876292B2

(12) United States Patent
Chu et al.

(10) Patent No.: US 11,876,292 B2
(45) Date of Patent: Jan. 16, 2024

(54) SLOT ANTENNA ASSEMBLY

(71) Applicant: ASUSTeK COMPUTER INC., Taipei (TW)

(72) Inventors: Fang-Hsien Chu, Taipei (TW); Peng-Hao Juan, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 77 days.

(21) Appl. No.: 17/514,067

(22) Filed: Oct. 29, 2021

(65) Prior Publication Data

US 2022/0149533 A1 May 12, 2022

(30) Foreign Application Priority Data

Nov. 11, 2020 (TW) ................................ 109139407

(51) Int. Cl.
*H01Q 13/10* (2006.01)
*H01Q 5/378* (2015.01)

(52) U.S. Cl.
CPC ............ *H01Q 13/10* (2013.01); *H01Q 5/378* (2015.01)

(58) Field of Classification Search
CPC ............................... H01Q 13/10; H01Q 5/378
See application file for complete search history.

(56) References Cited

U.S. PATENT DOCUMENTS

| | | | | |
|---|---|---|---|---|
| 10,084,228 | B2 | 9/2018 | Chiu et al. | |
| 2012/0276856 | A1* | 11/2012 | Joshi | H01Q 21/08 29/601 |
| 2018/0040957 | A1* | 2/2018 | Chen | H01Q 13/10 |

FOREIGN PATENT DOCUMENTS

| | | | |
|---|---|---|---|
| CN | 104701607 | A | 6/2015 |
| CN | 108400436 | A | 8/2018 |
| CN | 109119742 | A | 1/2019 |
| TW | 201728003 | A | 8/2017 |
| TW | 201814957 | A | 4/2018 |
| TW | 201906228 | A | 2/2019 |
| TW | M583629 | U | 9/2019 |

* cited by examiner

*Primary Examiner* — Dieu Hien T Duong
(74) *Attorney, Agent, or Firm* — McClure, Qualey & Rodack, LLP

(57) ABSTRACT

A slot antenna assembly adapted to a metal case is provided in the disclosure. The slot antenna assembly includes a substrate and a metal wire. The substrate includes a first sheet plate and a second sheet plate. The first sheet plate is conductive and is provided with a slot opposite to an opening of the metal case, a size of the slot being less than or equal to a size of the opening. The second sheet plate is not conductive and is connected to the first sheet plate. The metal wire is located on a surface of the second sheet plate to be connected to a feeding signal. A vertical projection of the metal wire on the first sheet plate crosses the slot, and the metal wire and the slot together excite a low-frequency mode and a high-frequency mode.

9 Claims, 3 Drawing Sheets

SLOT ANTENNA ASSEMBLY

CROSS-REFERENCE TO RELATED APPLICATION

This application claims the priority benefit of Taiwan Application Serial No. 109139407, filed on Nov. 11, 2020. The entirety of the above-mentioned patent application is hereby incorporated by reference herein and made a part of the specification.

BACKGROUND OF THE INVENTION

Field of the Invention

The disclosure relates to a slot antenna assembly.

Description of the Related Art

A slot antenna controls offset of operation frequency of the antenna by a length of a slot. The case of an electronic device is provided with a slot, a size and a length of the slot are often limited by the appearance of aesthetics or the mechanism space, and the slot antenna is apt to be affected by the environment and material of the mechanism, resulting the offset of operation frequency. Currently, different dielectric constants are caused by different colors, different materials, or different metal composition proportions of the case, resulting in the frequency offset, that is, it is impossible to share a slot antenna with a same size among electronic devices with different cases. If the properties of the slot antenna are greatly affected, it would take more time to adjust the length of the slot by modifying a mold, in which case, product development falls behind the schedule, and the cost of modifying the mold is also high.

BRIEF SUMMARY OF THE INVENTION

According to an aspect of the disclosure, a slot antenna assembly adapted to a metal case with an opening is provided. The slot antenna assembly includes a substrate and a metal wire. The substrate includes a first sheet plate and a second sheet plate. The first sheet plate is conductive and is provided with a slot opposite to the foregoing opening, a size of the slot being less than or equal to a size of the opening. The second sheet plate is not conductive and is connected to the first sheet plate. The metal wire is located on a surface of the second sheet plate to be connected to a feeding signal. A vertical projection of the metal wire on the first sheet plate crosses the slot, and the metal wire and the slot together excite a low-frequency mode and a high-frequency mode.

DETAILED DESCRIPTION OF THE EMBODIMENTS

Figure 1:
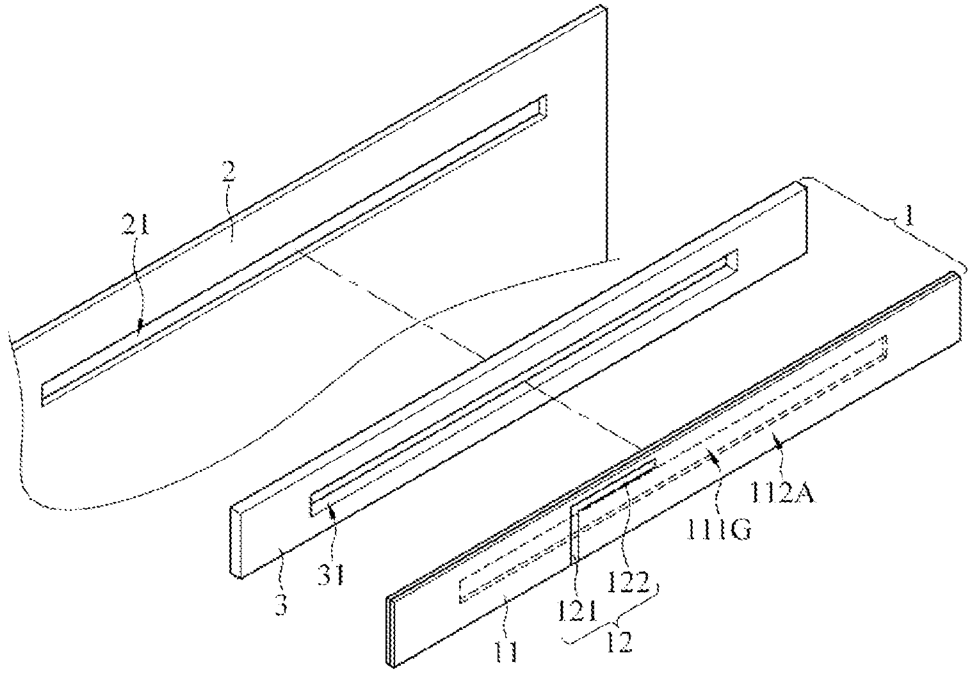
FIG. 1 is a schematic exploded view of a slot antenna assembly combined with a metal case according to a first embodiment of the disclosure.
Figure 2:
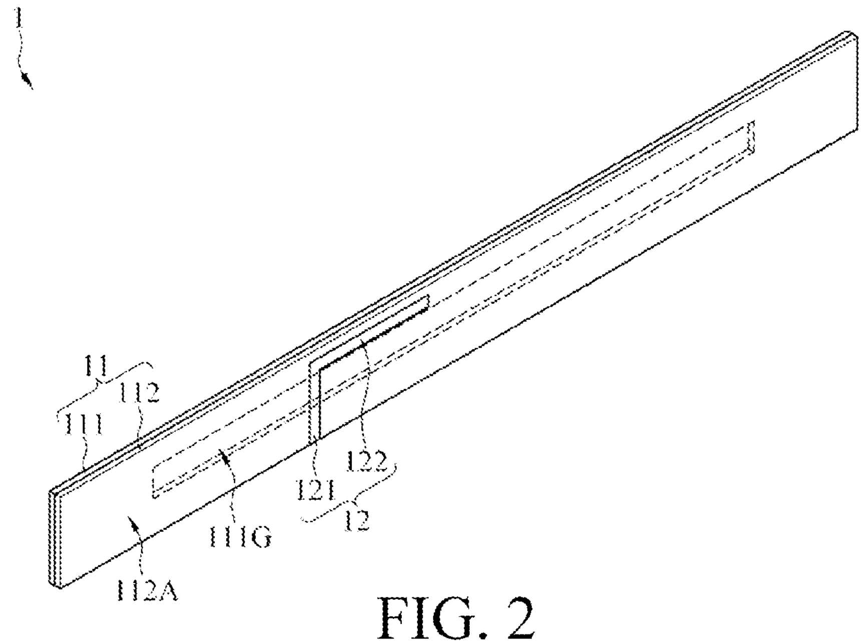
FIG. 2 is an enlarged schematic diagram of the substrate and the metal wire shown in FIG. 1.

Referring to FIG. 1 to FIG. 4 together, a slot antenna assembly 1 is combined to an opening 21 of a metal case 2 of an electronic device, to support a low-frequency operating frequency band and a high-frequency operating frequency band. The slot antenna assembly 1 includes a substrate 11 and a metal wire 12. The substrate 11 includes a first sheet plate 111 and a second sheet plate 112, and the first sheet plate 111 and the second sheet plate 112 are in face-to-face connection. In an embodiment, the first sheet plate 111 and the second sheet plate 112 are connected to each other in a manner of welding or pasting. In an embodiment, the first sheet plate 111 and the second sheet plate 112 are made of different materials, the first sheet plate 111 is conductive, and the second sheet plate 112 is not conductive. The first sheet plate 111 is provided with a slot 111G (hereinafter referred to as a first slot 111G), a shape of the first slot 111G is formed corresponding to a shape of the opening 21, the first slot 111G and the opening 21 have a same extension direction, and a size of the first slot 111G is less than or equal to a size of the opening 21, that is, a vertical projection of the opening 21 on the first sheet plate 111 is made greater than or equal to the first slot 111G.

The metal wire 12 is located on a surface 112A of the second sheet plate 112, a vertical projection of the metal wire 12 on the first sheet plate 111 crosses the first slot 111G. Because the first slot 111G is provided corresponding to the opening 21, the vertical projection of the metal wire 12 on the first sheet plate 111 also crosses the vertical projection of the opening 21 on the first sheet plate 111. Based on this, when a feeding signal is fed to the metal wire 12, the metal wire 12 and the first slot 111G are coupled to excite the high-frequency operating frequency band and the low-frequency operating frequency band. A high-frequency mode of the high-frequency operating frequency band is determined according to a physical length of the metal wire 12, and a low-frequency mode of the low-frequency operating frequency band and a frequency-doubling mode of the low-frequency mode are determined according to a physical length of the first slot 111G. That is, the slot antenna assembly 1 is excited by the feeding signal, to support the high-frequency operating frequency band and the low-frequency operating frequency band. In a case that different dielectric constants of the metal case 2 caused by moldings with different colors or materials cause the designed operating frequency band to offset, a designer of the slot antenna assembly 1 adjusts the size of the opening 21 without modifying a mold of the metal case 2, and the designer freely adjusts the size of the first slot 111G and a size of the metal wire 12 according to the dielectric constant of the molding, to effectively adjust a resonance frequency of the first slot 111G and correct a problem of resonance frequency offset. The slot antenna assembly 1 supports both default high-frequency operating frequency band and low-frequency operating frequency band regardless of the dielectric constant of the molding on the metal case 2.

In an embodiment, the metal wire 12 is made of conductive materials (such as silver, copper, aluminum, iron, or alloys thereof), and the metal wire 12 is printed on the surface 112A of the second sheet plate 112, that is, the metal wire 12 is a trace on the surface 112A of the second sheet plate 112.

In an embodiment, the first slot 111G and the opening 21 are rectangular, the first slot 111G and the opening 21 have a same width W, and a length of the first slot 111G is less than or equal to a length of the opening 21. In this case, the opening 21 is designed with a relatively longer length. When the actual operating frequency band of the slot antenna assembly 1 is affected by different dielectric constants of the molding on the metal case 2 to offset, the length of the first slot 111G is adjusted within the relatively long length of the opening 21. That is, the first slot 111G has a relatively large length adjustment range, thereby effectively correcting the problem of frequency offset.

In an embodiment, the substrate 11 is welded to the metal case 2, to combine the slot antenna assembly 1 with the metal case 2. In another embodiment, as shown in FIG. 1, the slot antenna assembly 1 further includes a conductive viscous assembly 3 with viscosity. The conductive viscous assembly 3 is a conductive foam. The conductive viscous assembly 3 is disposed between the metal case 2 and the first sheet plate 111 of the substrate 11, and the conductive viscous assembly 3 is in direct contact with or electrically connected to surfaces of the metal case 2 and the first sheet plate 111. The substrate 11 is fixedly disposed on the metal case 2 by the viscosity of the conductive viscous assembly 3.

Figure 3:
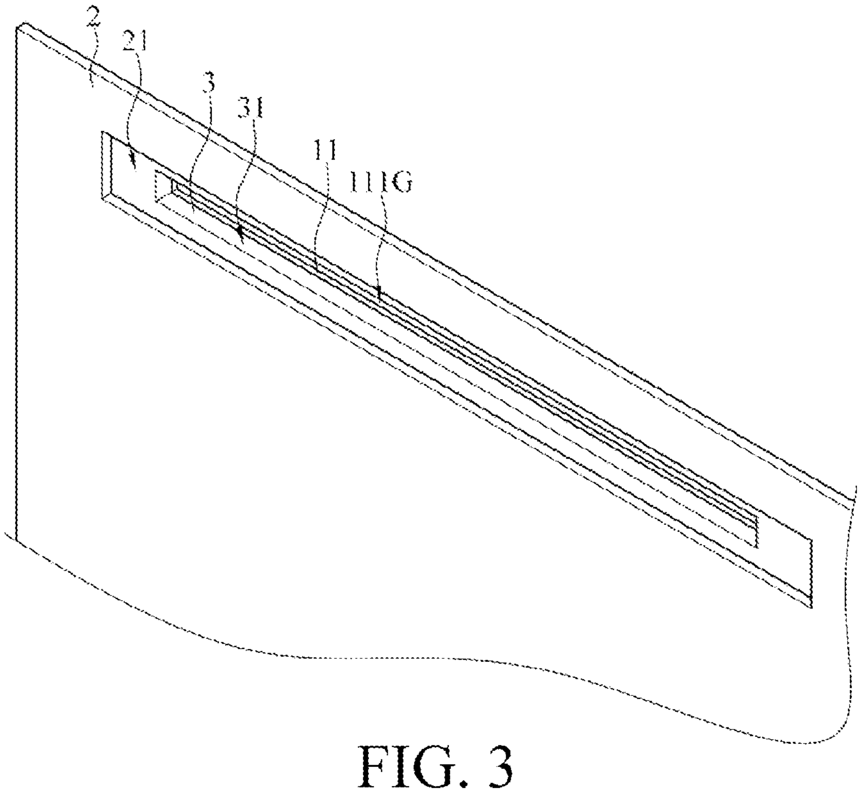
FIG. 3 is a three-dimensional schematic back view of the slot antenna assembly combined with the metal case shown in FIG. 1.

In an embodiment, the conductive viscous assembly 3 is conductive, and the conductive viscous assembly 3 is provided with a slot 31 (hereinafter referred to as a second slot 31). The second slot 31 is provided aligned with and opposite to the first slot 111G, the second slot 31 and the first slot 111G have a same extension direction, and a size of the second slot 31 is equal to a size of the first slot 111G (in an embodiment, a length of the second slot 31 is substantially equal to a length of the first slot 111G, and a width W of the second slot 31 is substantially equal to a width W of the first slot 111G). That is, the opening 21 is vertically projected onto the conductive viscous assembly 3, and the second slot 31 is included within a vertical projection range of the opening 21 on the conductive viscous assembly 3. That is, the width of the second slot 31 and the first slot 111G is less than the width of the opening 21, as shown in FIG. 3. Therefore, observing from a back perspective of the metal case 2, part of the conductive viscous assembly 3 is seen through the opening 21, and the length of the second slot 31 and the first slot 111G is less than the length of the opening 21. Further, a thickness of the conductive viscous assembly 3 is greater than a thickness of the first sheet plate 111, and in addition to fixedly disposing the substrate 11 on the metal case 2, the conductive viscous assembly 3 is electrically connected to the metal case 2 and the first sheet plate 111 by the electrical conductivity of the conductive viscous assembly 3.

Figure 4:
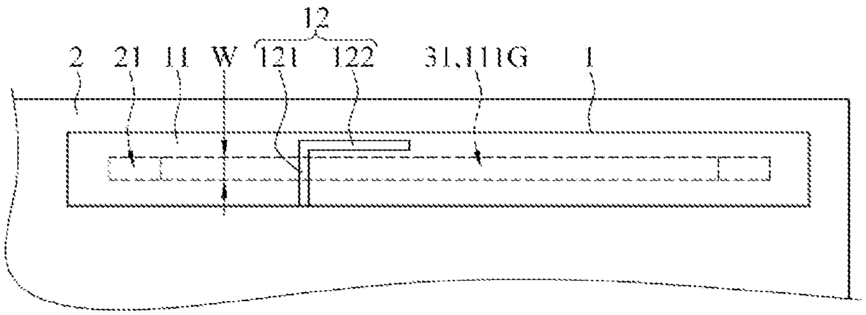
FIG. 4 is a schematic top view of the slot antenna assembly combined with the metal case shown in FIG. 1.

In an embodiment, the metal wire 12 includes a first wire 121 and a second wire 122 that are vertically connected with each other. As shown in FIG. 4, a vertical projection of the first wire 121 on the first sheet plate 111 crosses and is perpendicular to the first slot 111G, an end of the first wire 121 away from the second wire 122 is connected to the feeding signal, a vertical projection of the first wire 121 on the conductive viscous assembly 3 is perpendicular to and crosses the second slot 31, and a vertical projection of the first wire 121 on the metal case 2 is perpendicular to and crosses the opening 21. A vertical projection of the second wire 122 on the first sheet plate 111 is parallel to the first slot 111G, a vertical projection of the second wire 122 on the conductive viscous assembly 3 is parallel to the second slot 31, and a vertical projection of the second wire 122 on the metal case 2 is parallel to the opening 21. Based on this, an L shape is formed between the first wire 121 and the second wire 122.

In an embodiment, the metal wire 12 is connected to the first sheet plate 111, the second wire 122 of the metal wire 12 extends along the surface 112A of the second sheet plate 112 in a direction toward a side of the second sheet plate 112, extends to a side of the first sheet plate 111 through the side of the second sheet plate 112, and then extends to the surface of the first sheet plate 111 through the side of the first sheet plate 111. That is, the second wire 122 of the metal wire 12 is connected to the first sheet plate 111, to form a matching assembly with distributed inductance between the metal wire 12 and the first sheet plate 111, to further provide better impedance matching.

In an embodiment, the physical length of the metal wire 12 is 0.25 time of a wavelength of the high-frequency operating frequency band. Further, the opening 21 of the metal case 2, the second slot 31 of the conductive viscous assembly 3, and the first slot 111G of the first sheet plate 111 of the substrate 11 are all rectangular, and the opening 21, the second slot 31, and the first slot 111G are closed-slot holes, that is, all the opening 21, the second slot 31, and the first slot 111G include two closed ends, and the physical length of the first slot 111G is 0.5 time of a wavelength of the low-frequency operating frequency band.

Figure 5:
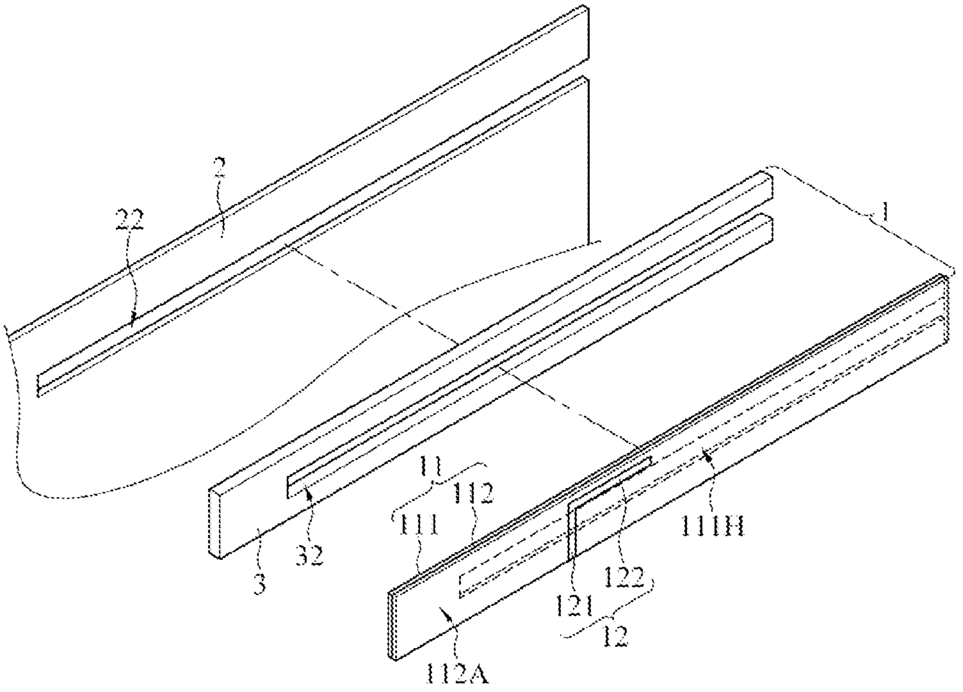
FIG. 5 is a schematic exploded view of a slot antenna assembly according to a second embodiment of the disclosure.

In an embodiment, FIG. 5 is a schematic exploded view of a slot antenna assembly 1 combined with a metal case according to a second embodiment of the disclosure. A difference between the second embodiment and the first embodiment lies in that an opening 22 of the metal case 2, a slot 32 of the conductive viscous assembly 3 (hereinafter referred to as a second slot 32), and a slot 111H of the substrate 11 (hereinafter referred to as a first slot 111H) are all slotted holes. That is, the opening 22, the second slot 32, and the first slot 111H include an open end respectively. Based on this, a physical length of the first slot 111H is 0.25 time of the wavelength of the low-frequency operating frequency band, and the physical length of the first slot 111H is less than a physical length of the first slot 111G. Corresponding to a relatively short physical length of the first slot 111H, a physical length of the opening 22 is also less than a physical length of the opening 21, and a physical length of the second slot 32 is also less than a physical length of the second slot 31. An overall size of the slot antenna assembly 1 having the slotted hole is reduced, to reduce a space occupied by the slot antenna assembly 1 in the electronic device.

In conclusion, for the slot antenna assembly according to an embodiment of the disclosure, in a case that different dielectric constants of the metal case caused by different metal colors and materials cause the designed antenna operating frequency band to offset, the designer adjusts the size of the opening without modifying the mold of the metal case, and the designer freely adjusts the size of the slot and the metal wire according to the dielectric constant of the molding on the metal case, to effectively adjust the resonance frequency of the slot and correct the problem of resonance frequency offset. The slot antenna assembly supports both default high-frequency operating frequency band and low-frequency operating frequency band regardless of the dielectric constant of the molding on the metal case. Further, the slot antenna assembly includes slotted holes, to reduce the overall size and reduce a space occupied by the slot antenna assembly in the electronic device.

Although the disclosure is disclosed in the above by using embodiments, the embodiments are not intended to limit the disclosure. Anyone having ordinary knowledge in the technical field can make some changes and refinements without departing from the spirit and scope of the disclosure. Therefore, the protection scope of the disclosure is subject to that defined by the attached claims.

What is claimed is:

1. A slot antenna assembly, adapted to a metal case with an opening, comprising:

a substrate combined with the metal case, wherein the substrate comprises:

a first sheet plate, being conductive and provided with a first slot opposite to the opening, a size of the first slot being less than or equal to a size of the opening;

a second sheet plate, being not conductive and connected to the first sheet plate;

a metal wire, located on a surface of the second sheet plate to be connected to a feeding signal, wherein a vertical projection of the metal wire on the first sheet plate crosses the first slot, and the metal wire and the first slot excite a low-frequency mode and a high-frequency mode together; and a conductive viscous assembly, disposed between the substrate and the metal case, wherein the conductive viscous assembly is provided with a second slot opposite to the first slot, a width of the second slot is equal to a width of the first slot, a length of the second slot is equal to a length of the first slot;

wherein the width of the first slot is less than a width of the opening, and the length of the first slot is less than a length of the opening.

2. The slot antenna assembly according to claim 1, wherein the metal wire comprises a first wire and a second wire vertically connected with each other, and an end of the first wire away from the second wire is connected to the feeding signal.

3. The slot antenna assembly according to claim 2, wherein a vertical projection of the first wire on the first sheet plate crosses the first slot, and a vertical projection of the second wire on the first sheet plate is parallel to the first slot.

4. The slot antenna assembly according to claim 1, wherein the metal wire extends from the second sheet plate to the first sheet plate to connect to the first sheet plate, to form a matching assembly.

5. A slot antenna assembly, adapted to a metal case with an opening, comprising:

a substrate combined with the metal case, wherein the substrate comprises:

a first sheet plate, being conductive and provided with a first slot opposite to the opening, a size of the first slot being less than or equal to a size of the opening;

a second sheet plate, being not conductive and connected to the first sheet plate;

a metal wire, located on a surface of the second sheet plate to be connected to a feeding signal, wherein a vertical projection of the metal wire on the first sheet plate crosses the first slot, and the metal wire and the first slot excite a low-frequency mode and a high-frequency mode together; and a conductive viscous assembly, disposed between the substrate and the metal case, wherein the conductive viscous assembly is electrically connected to the first sheet plate and the metal case, to combine the substrate with the metal case, and the conductive viscous assembly is provided with a second slot opposite to the first slot.

6. The slot antenna assembly according to claim 5, wherein the first slot and the second slot are closed-slot holes.

7. The slot antenna assembly according to claim 5, wherein the first slot and the second slot are slotted holes.

8. The slot antenna assembly according to claim 5, wherein a width of the second slot is equal to a width of the first slot, and a length of the second slot is equal to a length of the first slot.

9. The slot antenna assembly according to claim 5, wherein a thickness of the conductive viscous assembly is greater than a thickness of the first sheet plate.

* * * * *